US010755479B2

(12) United States Patent
Colbert

(10) Patent No.: US 10,755,479 B2
(45) Date of Patent: Aug. 25, 2020

(54) SYSTEMS AND METHODS FOR SYNTHESIZING IMAGES OF APPAREL ENSEMBLES ON MODELS

(71) Applicant: Marcus C. Colbert, Emerald Hills, CA (US)

(72) Inventor: Marcus C. Colbert, Emerald Hills, CA (US)

(73) Assignee: Mad Street Den, Inc., Fremont, CA (US)

( * ) Notice: Subject to any disclaimer, the term of this patent is extended or adjusted under 35 U.S.C. 154(b) by 0 days.

(21) Appl. No.: 16/422,278

(22) Filed: May 24, 2019

(65) Prior Publication Data

US 2019/0287301 A1    Sep. 19, 2019

Related U.S. Application Data

(63) Continuation-in-part of application No. 15/634,171, filed on Jun. 27, 2017, now Pat. No. 10,304,227.

(51) Int. Cl.
| | |
|---|---|
| *G09G 5/00* | (2006.01) |
| *G06T 19/00* | (2011.01) |
| *G06K 9/62* | (2006.01) |
| *G06N 3/08* | (2006.01) |
| *G06N 3/04* | (2006.01) |

(52) U.S. Cl.
CPC ............ *G06T 19/00* (2013.01); *G06K 9/6256* (2013.01); *G06N 3/04* (2013.01); *G06N 3/08* (2013.01); *G06T 2210/16* (2013.01)

(58) Field of Classification Search
CPC .......... G06K 9/6256; G06N 3/04; G06N 3/08; G06T 19/00; G06T 19/006; G06T 19/20; G06T 2210/16
See application file for complete search history.

(56) References Cited

U.S. PATENT DOCUMENTS

| | | | | |
|---|---|---|---|---|
| 5,680,528 | A * | 10/1997 | Korszun ................ | A41H 3/007 345/630 |
| 7,308,332 | B2 * | 12/2007 | Okada ..................... | G06F 30/20 700/130 |
| 7,657,340 | B2 * | 2/2010 | Lind ...................... | A41H 3/007 345/419 |

(Continued)

OTHER PUBLICATIONS

Hu et al., A Hybrid Neural Network and Immune Algorithm Approach for Fit Garment Design, Textile Research Journal, vol. 79, Issue 14, 2009 pp. 1319-1330 (Year: 2009).*

*Primary Examiner* — Charles Tseng

(74) *Attorney, Agent, or Firm* — Mersenne Law

(57) ABSTRACT

Neural networks of suitable topology are trained with sets of images, where one image of each set depicts a garment and another pair of images of each set depicts an item of apparel from multiple viewpoints, and a final image of each set depicts a model wearing the garment and the other item of apparel. Once trained, the neural network can synthesize a new image based on input images including an image of a garment and a pair of images of another item of apparel. Quantitative parameters controlling the image synthesis permit adjustment of features of the synthetic image, including skin tone, body shape and pose of the model, as well as characteristics of the garment and other items of apparel.

12 Claims, 8 Drawing Sheets

(56) References Cited

U.S. PATENT DOCUMENTS

| | | | |
|---|---|---|---|
| 2004/0049309 A1* | 3/2004 | Gardner | A41H 1/00 700/132 |
| 2011/0234581 A1* | 9/2011 | Eikelis | G06K 9/00228 345/419 |
| 2011/0298897 A1* | 12/2011 | Sareen | G06N 3/006 348/47 |
| 2014/0010449 A1* | 1/2014 | Haaramo | G06T 19/00 382/173 |
| 2016/0275375 A1* | 9/2016 | Kant | G06K 9/4604 |
| 2017/0278135 A1* | 9/2017 | Majumdar | G06Q 30/0256 |
| 2018/0060701 A1* | 3/2018 | Krishnamurthy | G06N 3/04 |

* cited by examiner

SYSTEMS AND METHODS FOR SYNTHESIZING IMAGES OF APPAREL ENSEMBLES ON MODELS

CONTINUITY AND CLAIM OF PRIORITY

This U.S. patent application is a continuation-in-part of U.S. patent application Ser. No. 15/634,171 filed 27 Jun. 2017 (now U.S. Pat. No. 10,304,227 issued 28 May 2019) and claims priority to that application. The prior disclosure is included by this reference.

FIELD

The invention relates to automatic image generation. More specifically, the invention relates to methods for creating synthetic images based on a training set of image pairs. Once trained, an embodiment can accept a new image that is like one member of an image pair, and create a synthetic image representing what the other image of the pair might look like.

BACKGROUND

Neural networks are computing systems that are inspired by biological processes. In particular, they comprise a plurality of modules that are designed to operate similarly to the way biological neurons are thought to function. Neurons are often modeled as multiple-input, single-output thresholding accumulators, which "fire" if enough of the inputs are active enough. (The output of one model neuron may be connected to a number of subsequent neurons model inputs, or even to previous neuron models in a feedback loop.) Although the function of a single neuron model is quite simple, it has been observed that a large number of models operating simultaneously, which are configured or "trained" properly, can produce surprisingly good results in problems that are difficult to address with traditional data processing or programming techniques.

One common neural-network task is image recognition: a plurality of neurons are arranged in a pyramid-like hierarchy, with an array of input neurons for each pixel of an image, followed by one or more decreasing-sized layers of neurons, and where an output neuron is designated to indicate whether an input image has a characteristic of interest. Such a network can be "trained" by exposure to a set of images where the characteristic of interest is present or absent. For example, the characteristic may be whether a penguin is present in the image. Once trained, the network may be able to determine fairly accurately whether a penguin is depicted in a new image, not part of the training set.

Neural networks can also be used to generate or synthesize new information based on prior training and a random seed. For example, biophysicist Dr. Mike Tyka has experimented with training neural networks to generate images that resemble artistic portraits of human faces, although there is no actual subject involved, and any resemblance to an individual is purely coincidental.

Although neural networks are not infallible (recognizers may misidentify a target, or generative networks may construct output that is not usable for the intended purpose) they are often adequate for practical use in applications where deterministic methods are too slow, too complex or too expensive. Thus, neural networks can fill a gap between rote mechanical methods that are easy to implement on a computer, and labor-intensive methods that depend on human judgment to achieve best results.

SUMMARY

A neural network is trained with pairs of images, where one image of a pair shows a garment, and the other image shows a model wearing the garment. Then, a new image is presented to the trained network, and a synthetic image that might be the new image's pair is automatically generated. The synthetic image is displayed to a user.

DETAILED DESCRIPTION

Most people wear clothes, and many people choose and purchase some of their clothes from vendors who do not (or cannot) offer the customer an opportunity to try on the garment before purchase. Catalog and online retailers (among others) often go to great lengths to produce photos of their garments worn by representative models and presented in common situations; these photos are important to convey the impression of the fit and appearance of a garment to a customer who cannot see it in person.

Embodiments of the invention use neural networks to synthesize images of models wearing garments from less-expensive images of the garments alone. Beneficially, the synthesis process exposes controls that can be used to adjust characteristics of the synthesized image. For example, the skin tone, body shape, pose and other characteristics of the model in the synthesized image may be varied over a useful range. This permits a user (e.g., a customer) to adjust a synthetic "as-worn" image to resemble the user more closely. Thus, in addition to reducing the cost of producing representative photos, an embodiment allows a user to get a better idea of how a particular garment may appear when worn by the user. This improved representation may improve a retailer's chance of making a sale (or of avoiding the return of a garment that, upon trying on, the purchaser did not like).

Embodiments accomplish this synthesis by leveraging the power of software systems known as "neural networks." Neural networks are often used to perform automatic recognition of objects and features in images; they can answer questions like "does this image show the Eiffel Tower?" or "does this image include a person wearing a hat?" Neural networks can also be configured to generate or synthesize new images which are similar to other images on which they have been trained. When these two types of neural networks (recognition and synthesis) are plumbed together, they form a Generative Adversarial Network ("GAN"), where the synthesizer optimizes its output to produce images that cause the recognizer to answer "yes" and the recognizer optimizes its analysis to reduce the likelihood that it will be "fooled" by a synthetic image. Thus, one possible GAN could be trained to produce better and better images of a person wearing a hat. (It is appreciated that some synthetic images of "a person wearing a hat" might fool the recognizer, but not look anything like a person wearing a hat; but generally, if the networks' training is performed carefully, many or most of the synthesized images will be useful in a process that requires pictures that a human will recognize as "a picture of a person wearing a hat.")

Figure 1:
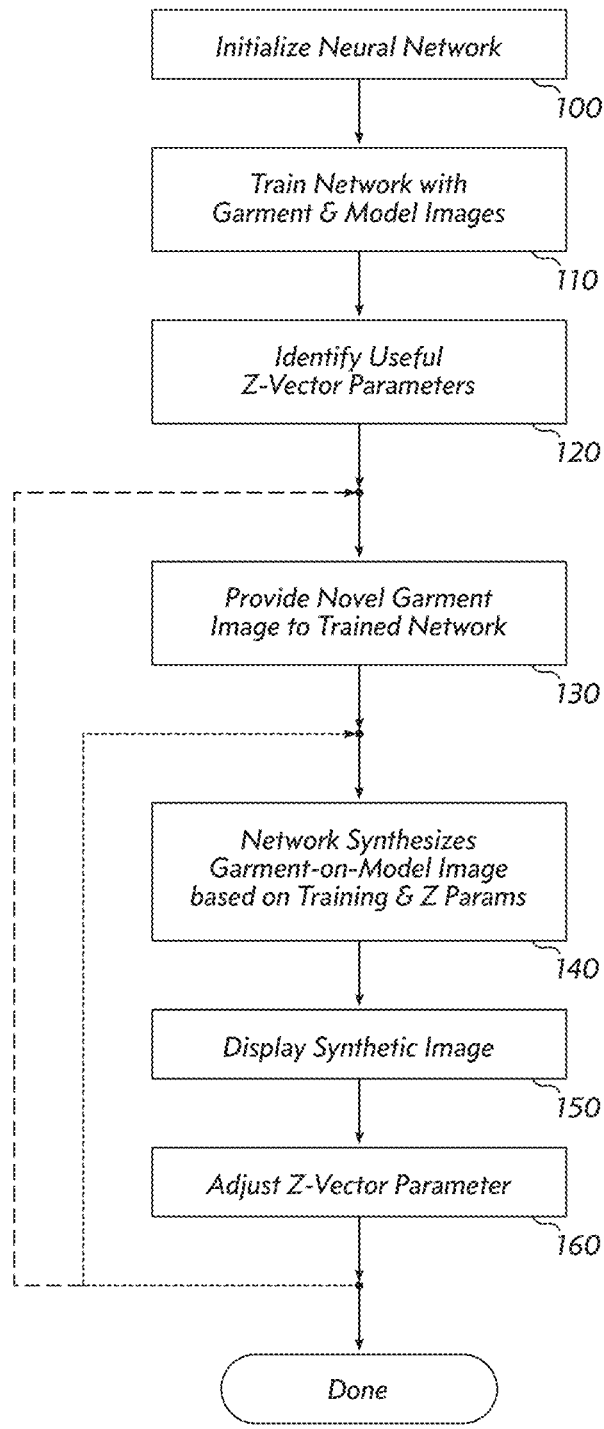
FIG. 1 is a flow chart outlining a method according to an embodiment of the invention.

FIG. 1 shows an overview of a central portion of an embodiment's operations. The method begins by initializing a neural network (100). This network is trained using pairs of images (110): one image of each pair shows a garment (e.g., a garment laid out flat on a neutral surface); and the other image of each pair shows a model wearing the garment. Once training is complete, useful parameters from the "Z vector" (described below) are identified (120).

Now, in typical use, a garment image is provided to the trained network (130). The garment image need not be (and preferably is not) one of the training images, but instead is an image without a corresponding mate. The network synthesizes an image of this garment on a model, based on the network's training and parameters of the Z vector (140). The synthetic image is displayed to the user (150). The user may adjust a Z vector parameter (160) and a new image is synthesized (140) and displayed (150). The adjustment and re-synthesizing may be repeated as often as desired to produce a variety of synthetic images of a model wearing the garment.

The Z vector parameters may control characteristics such as the model's skin tone, body shape and size, pose or position, and even accessories (e.g., shoe style, handbags, glasses, scarves or jewelry), so the user may be able to control the synthesis process to produce images that more closely resemble what the garment would look like if worn by the user.

Figure 2:
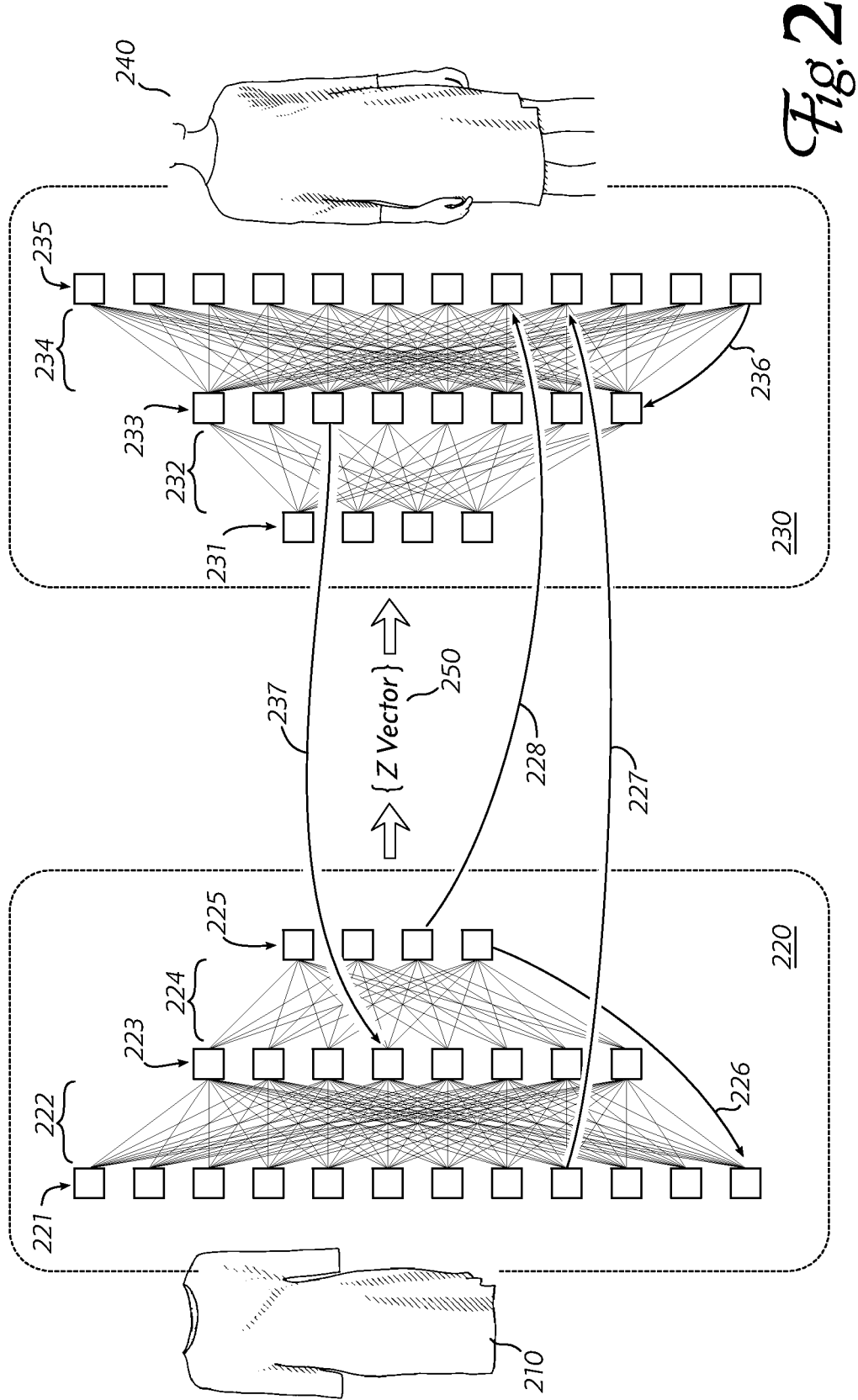
FIG. 2 is a simplified representation of data flow through a neural network implementing an embodiment of the invention.

FIG. 2 shows a conceptual representation of a Generative Adversarial Network, which is one type of neural network that can be used in an embodiment of the invention. Information can generally be understood as passing from left to right across the drawing. An image of a garment 210 is communicated to an input layer 221 of a first neural network 220. The input layer may have approximately as many input elements as there are pixels in the input image (i.e., many more elements than are shown in this drawing). Or, an input layer may comprise elements for each color channel of each input pixel (e.g., red, green and blue elements for each pixel). The input layer 221 is connected to an intermediate layer 223 by a network of variable connection weights 222, and the intermediate layer 223 is connected to an output layer 225 by a similar network 224. The connections are shown all-to-all, but each connection may be associated with a variable weight, so some connections may be effectively absent (weight=0). In addition to layer-to-layer connections, an embodiment may use feedback connections 226, which may go to an immediately preceding layer, or to an earlier layer. Each neural network may have more than the three layers shown here. In a preferred embodiment, about seven (7) layers are used.

Note that each layer of neural network 220 (traveling left to right) is smaller than the preceding layer. Thus, the network can be thought of as performing a kind of compression, resulting in Z-Vector 250, which in many embodiments is a vector of real numbers that comprises the outputs of the last layer of network 220.

Z-Vector 250 is used as an input to a second neural network 230. This network is similar in structure to network 220 (it comprises layers of model neurons 231, 233 and 235, interconnected by variable-weight connections 232, 234), but the number of elements in each layer is increasing (in the direction of data flow). Like network 220, network 230 may include feedback connections (e.g., 236) which carry data in the "opposite" direction. The output of network 230, once the GAN has been trained, is a synthetic image 240 that represents what garment 210 may look like when worn by a model.

In addition to the various intra-network connections, an embodiment may use inter-network connections 227, 228 or 237. These typically connect layers of similar depth (227, 237), but provisions may be made for connections between different depths (228). (Here, "depth" means "levels away from input of left-hand network 220 or levels away from output of right-hand network 230," in recognition of the fact that the networks are to some degree mirror images of each other.) These connections may be referred to as "skip connections." Conceptually, a skip connection provides a simple, direct way for the networks to pass through information that does not affect the "compression" and "synthesis" operations very much. For example, garment color is largely orthogonal to questions of how fabric tends to drape and hang on a figure—a red dress and a blue dress of equivalent construction would look about the same on a model, except for the color itself. Thus, a skip connection can carry the color of the sample image directly through to the output network, rather than relying on the input network to recognize the color and communicate it to the generative network through the Z vector.

Figure 3:
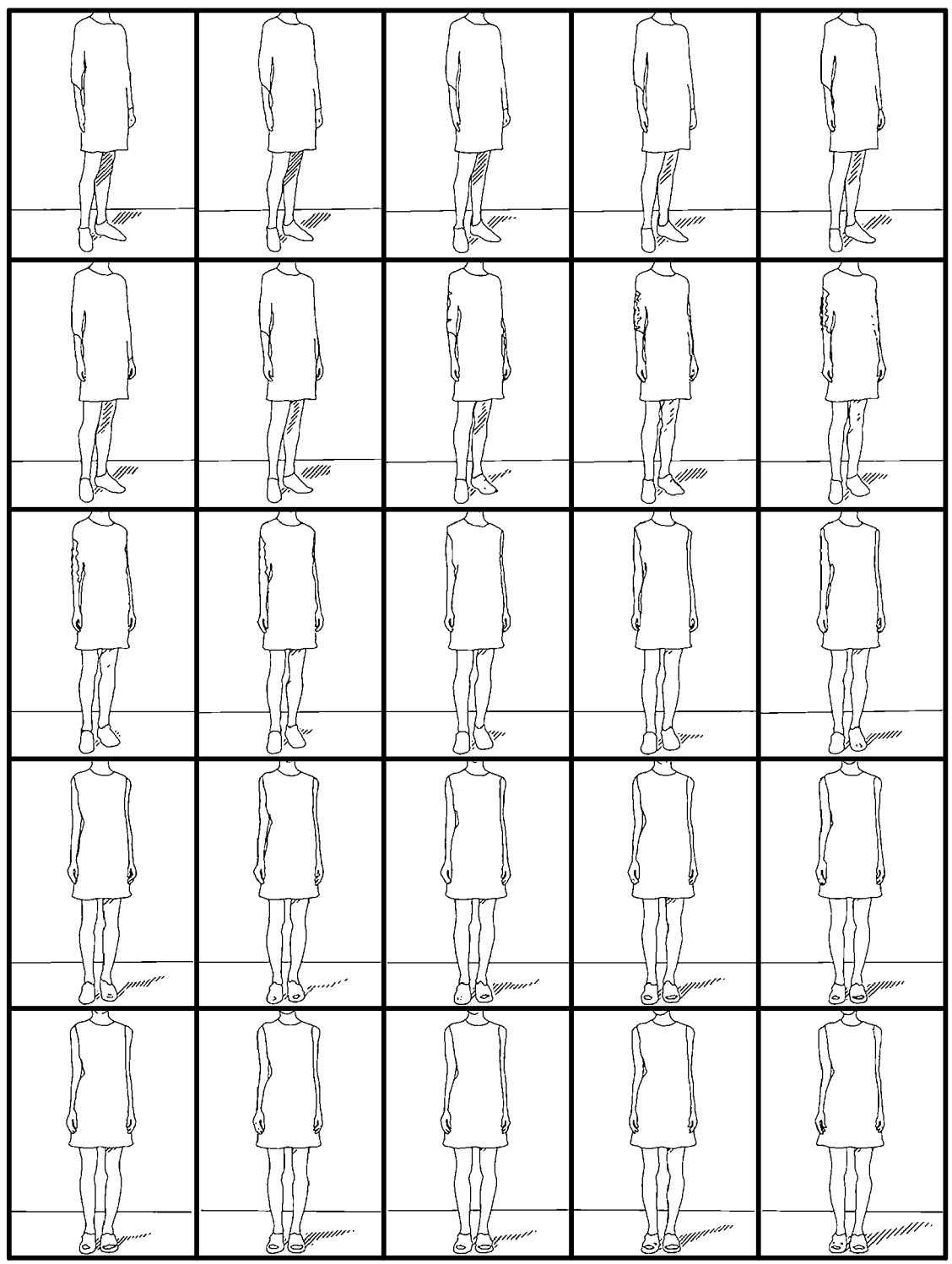
FIG. 3 shows a range of synthetic images created as a "model pose" image control parameter is varied.

Returning to the idea that network 220 performs something like compression, it turns out that some of the Z-Vector elements encode characteristics that the GAN has learned to recognize (and to use in image synthesis) after processing the training image pairs. For example, one Z-Vector element may control model skin tone. Another element may control model pose (including whether the model is facing the camera or turned to one side, or the position of the arms or legs). An element may control the style of shoe depicted in the synthesized image—these may be similar to one of the styles learned from the training images, but the output image shoes are not simply copied from one of the training-image model's legs. Instead, the generative network 230 constructs an image, including shoes or other accessories, that looks like it might have been seen among the training images, if the input image 210 had had a corresponding model-garment companion image. And critically, adjusting the Z-Vector elements can cause the generative network to make a new image with a different skin tone, model pose, or shoe style. Z-Vector elements may also control details such as dress length, sleeve length, or collar style. I.e., the synthesized image may show ways in which the garment might be altered, as well as ways in which the model might be altered. In one exemplary embodiment, a Z-Vector element controls model rotation, so even though the input dress image is shown head-on, a range of plausible dress-on-model images can be produced, with the model turning from left to right across the range. An example of this is shown in FIG. 3. All 25 images were synthesized from a single image of a black dress by a network trained with a variety of dress/model pairs of photos.

Although the Generative Autonomous Network ("GAN") depicted and described with reference to FIG. 2 is one type of neural network that is well-suited for use in an embodiment, other known types are also usable. For example, network configurations known in the art as Recurrent Neural Networks ("RNNs"), Recurrent Inference Machines ("RIMs"), and Variational Autoencoders ("VAEs") can all be trained with pairs of images as described above, can generate new synthetic images that could plausibly be the pair-mate of a new input image, and expose quantitative control parameters that can be varied proportionally to adjust features or characteristics of the synthetic images. The foregoing aspects of a neural network are important for use in an embodiment of the invention, namely:

Trainable with pairs of images;

Generates a synthetic image from a new input image, where the synthetic image resembles a "pair" image corresponding to the new input image (i.e., the new input image and the synthetic image could plausibly have been a pair in the training set); and Exposes quantitative control parameters that can be manipulated to change characteristics of the synthetic image, including characteristics such as:

| | |
|---|---|
| Model skin tone | Garment length |
| Model pose | Garment sleeve style |
| Model body weight, shape | Garment collar style |
| Accessories | Garment fit tightness |

One feature of a neural network suitable for use in an embodiment was mentioned briefly above, but bears further discussion. In FIG. 2, each node at a particular level was drawn with connections to all nodes at the next level. In addition, a few inter-level connections were shown. However, a neural network may be fully-connected: the weighted output of each node may form part of the input signal to every other node (even including the node itself). Such a network is very difficult to depict in a two-dimensional figure, but it is a common topology, known to practitioners of ordinary skill. Another alternative is a convolutional neural network. This topology is more space-efficient than a fully-connected network, so it can often operate on larger input images (and produce higher-resolution output images). Again, convolutional networks are known to those of ordinary skill in the art, and can be used to good effect by adhering to the principles and approaches described herein.

In an exemplary embodiment of the invention using a Generative Adversarial Network, input images may be about 192×256 pixels, with three color channels for each pixel (red, green & blue). Thus, the input layer comprises 192×256×3=147,456 neuron model elements. Subsequent layers decrease by a factor of two, and the Z vector ends up as 512×4×3=6,144 scalars. The generative network may mirror the input network, starting with the Z vector and emitting a 192×256 synthetic color image.

Not all elements of the Z vector correspond to a recognizable characteristic such as "skin tone," "dress length," "shoe style" or "model pose." The effects of individual vector elements (and of subsets of the vector) may be determined empirically, or by providing additional information about training image pairs (e.g., by tagging the images with characteristic descriptions) and propagating the additional information through the network during training.

One favorable approach to determining Z Vector component effect is to perform Principal Component Analysis ("PCA") on the Z Vector, to identify a smaller vector Z' whose components are largely linearly independent. The elements of Z' may be tested to determine their effect, and elements that affect characteristics of interest may be exposed to the user to control synthetic image generation.

Figure 4:
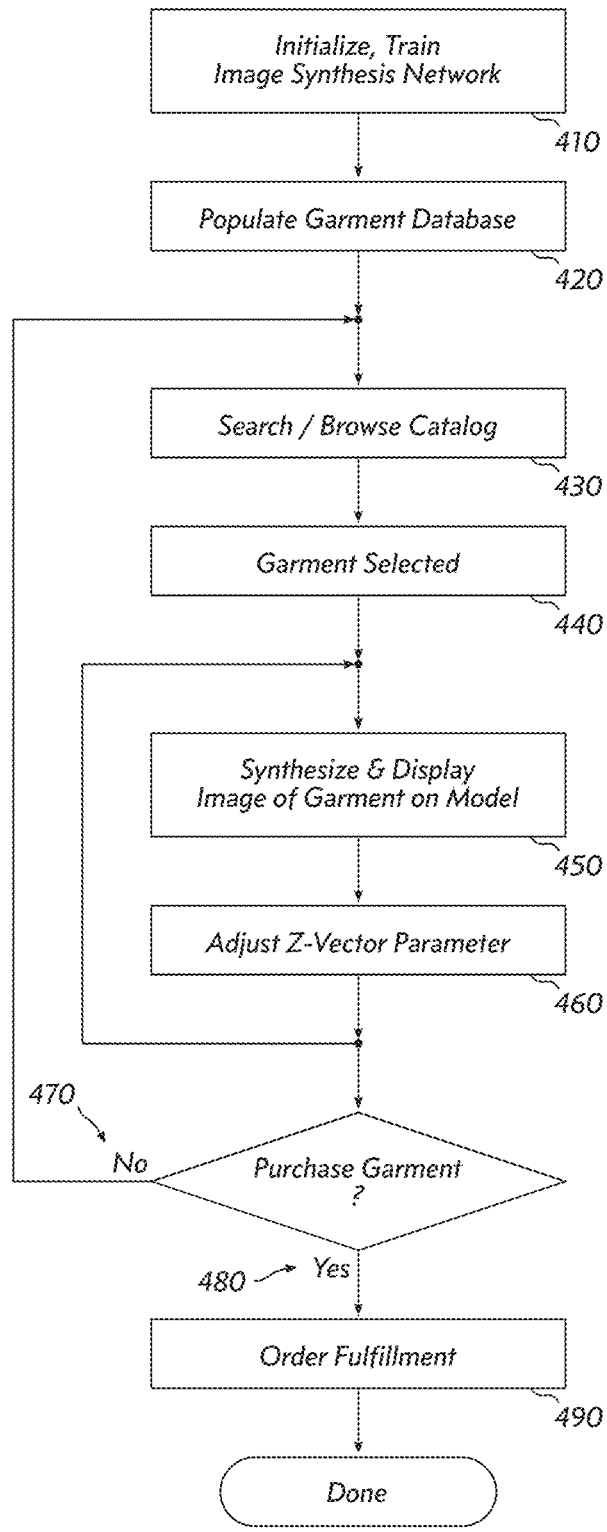
FIG. 4 is a flow chart outlining a more comprehensive application of an embodiment.

FIG. 4 outlines a method used by a complete application built around an image synthesizer according to an embodiment of the invention. To begin, a system operator initializes and trains a neural network as described above, using a training set of image pairs where one member of each pair depicts a garment, and the other member of each pair depicts a model wearing the garment (410). Next, a database of garment images is populated (420). These images are similar to the first images of the training set, and may even include the training images. These are, for example, images of garments offered for sale by the system operator.

When a customer visits the operator's system (e.g., when she accesses an e-commerce web site), she may search or browse the catalog of garments using any suitable prior-art method (430). For example, garments may be grouped and presented by color, style, weight, designer, size, price, or any other desired arrangement. When the user selects a garment (440), the system synthesizes and displays an image of the garment on a model (450). The user may be offered an array of controls which are connected to suitable elements of the Z-vector, and she may adjust those parameters as desired (460). When a parameter is adjusted, the system synthesizes and displays a new image of the garment on the model (450).

If the user decides not to purchase this garment (460), for example by clicking a "Back" button or returning to a list of search results, she may continue to view other garments for sale (430). If the user decides to purchase the garment (480), then information about the selected garment (e.g., a SKU) is passed to a prior-art order-fulfillment process for subsequent activity (490).

An embodiment of the invention may combine a garment selection control with controls for other aspects of image generation (skin tone, pose, body shape, accessories, etc.) Then, by manipulating individual controls of this plurality of controls, the user can change the garment (leaving the skin tone, pose, and accessories alone), or switch among accessories (leaving skin tone, pose and garment alone). This embodiment permits quick, self-directed comparisons among complete "outfits" or "looks," a capability that is currently provided at significant expense by human fashion coordinators, and consequently mostly unavailable to shoppers of ordinary or modest means.

Figure 5:
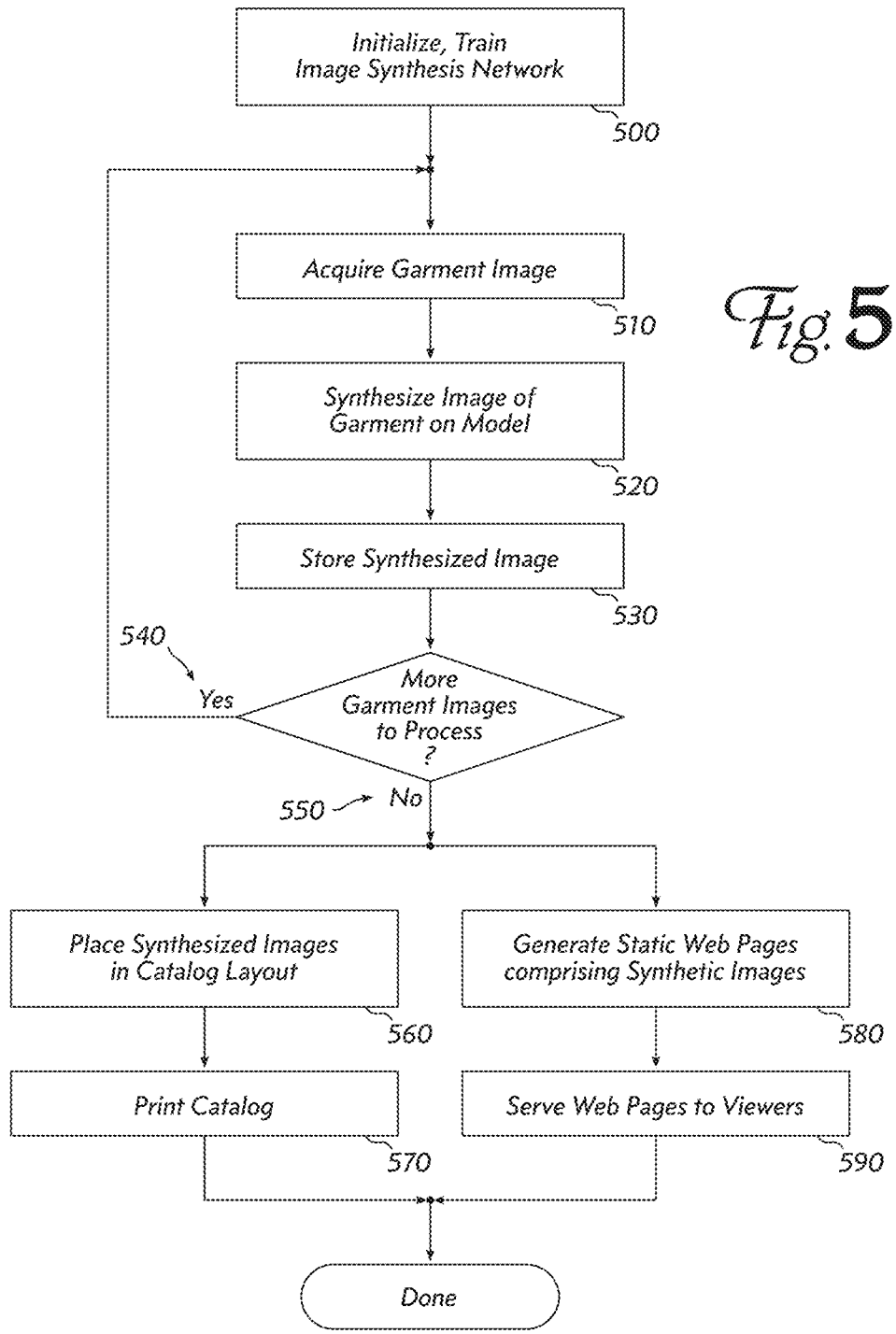
FIG. 5 is a flow chart outlining another application of an embodiment.

FIG. 5 outlines another application of an image synthesis network as described above. As before, the method begins by initializing and training an image synthesis network using a training set of image pairs (500). Next, the system acquires a garment image (510), synthesizes an image of the garment on a model (520), and stores the synthesized image (530). If there are more garment images to process (540), these steps are repeated, resulting in a library of synthesized images showing a variety of garments of which images were acquired and processed. The image synthesis may use randomly-chosen Z-vector parameters, which will yield a variety of different model skin tones, shapes, poses, and accessories in the synthesized image libraries.

When there are no more garment images to process (550), synthesized images from the library may be incorporated into a catalog layout (560) and printed (570); or a plurality of static web pages comprising one or more synthetic images may be generated (580), and those web pages may be served to visitors to a web site (590). This process may reduce the cost to produce a catalog of product images or a website displaying many garments.

It is appreciated that the method may be integrated with a prior-art garment processing sequence, such as a consignment dealer that receives many heterogenous garments from a variety of manufacturers. These garments may be passed through a steam chamber to dissipate storage or transport odors and to remove wrinkles. The garments may be placed on a mannequin during this process, and an image of the freshly-steamed garment may be automatically captured at the end. This image may be delivered to the process outlined in FIG. 5, as the "acquired image" at 510. Multiple views of the garment may be acquired, and may permit the synthesis of a greater variety of "garment on model" images, provided that the neural network has been trained with a correspondingly greater variety of image pairs.

The neural-network-based image synthesis system described in this application can be extended to perform more complex, useful tasks, without departing substantially from the general ideas set forth above. The extensions generally train a neural network using a set of input images, where the images fall into a number of categories. After training, the neural network is used to create new, synthetic images from inputs including, preferably, never-seen-before images which fit into the training categories. To express this concretely, recall that the earlier-described system is trained using pairs of images, where a first image shows a garment alone, and the second image shows a model wearing the garment. Once trained, a new image of a garment alone is presented, and the network synthesizes a new image that resembles a hypothetical model wearing the garment in the new image. The system could produce synthetic images of a model that included features other than the garment input, provided that some of the training images showed such elements. For example, as noted above, an element of the Z-vector might control the style of shoe depicted. But the shoe—like the model itself—was entirely a fabrication of the image synthesizer. The input analyzer or compressor had encountered training images including models wearing shoes, and it had "learned" to produce a plausible synthetic image that might include such a shoe.

In the system described below, training images include groups or sets of two or more related "component" images: a garment, a shoe, and an accessory (e.g., a handbag, bracelet, hat or similar); and a "target" image of a model wearing the garment, shoe and accessory. The goal of the training is to "teach" the network to recognize features of the target image that indicate that the model is wearing the apparel items depicted in the component images. Ultimately, in the customary manner of a Generative Adversarial Network ("GAN"), an image synthesizer network is set against the recognizer so that the synthesizer learns to create new images that the recognizer accepts as valid or plausible photos of a model wearing the input garments and accessories. Once this system has been trained, it can produce images that look like a model wearing a garment, shoe and accessory, without requiring a real model to put on the items and appear for a photo session. Of course, the synthesis control parameters (i.e., elements of the Z-vector) described above can be used to adjust the images synthesized by this more-complex system as well.

Figure 6:
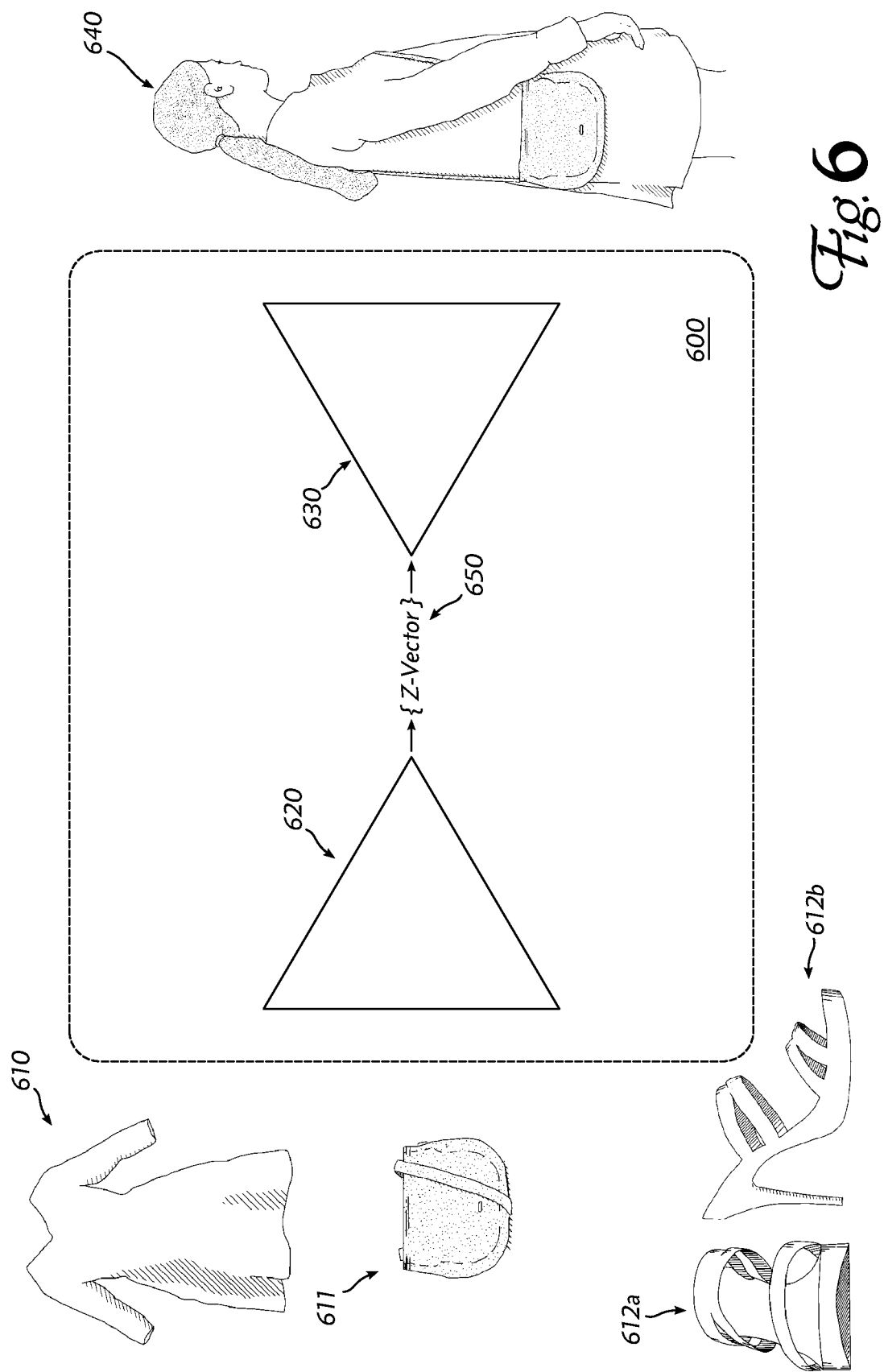
FIG. 6 is a simplified representation of data flow through a neural network implementing an embodiment of the invention.

FIG. 6 shows an overview of the inventive system with sample input categories on the left, a sample output (or training) image on the right, and the neural network 600 represented as an input recognizing ("compressing") network 620 having a reducing topology and producing a Z-Vector 650, which is operated on by an output "synthesizing" network 630 having an expanding topology to produce a synthetic image showing a plausible model wearing the various input items of apparel. An embodiment of this system accepts at least two different types of input apparel data, and produces at least one synthetic image that combines the input in a way that is plausible given the training of the network. Here, "plausible" does not mean "a copy of a previously seen training image, with certain parts replaced by portions of the input images." Instead, a "plausible" image is one that the recognizer (after training) evaluates as being an image that shows a model wearing the input garment and accessories.

Figure 7:
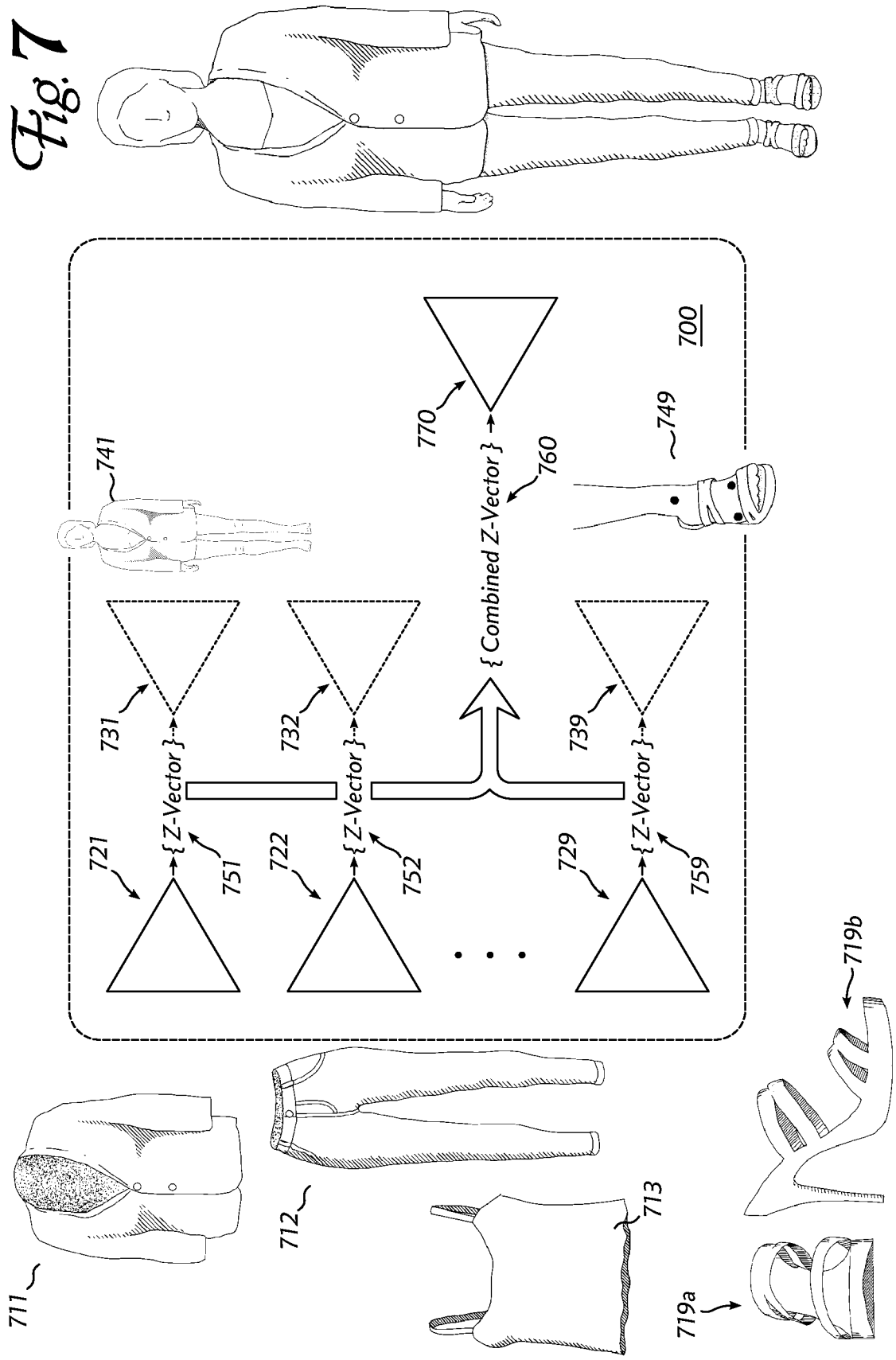
FIG. 7 is a more detailed representation of data flow through a neural network implementing an embodiment of the invention.

A naïve implementation of the neural-network black box of FIG. 6 might simply composite all of the input image data into a single large image, then rely on the training process to teach the network to recognize various portions of the large image and then synthesize images of a model wearing all of the input items. However, a more sophisticated implementation shown in FIG. 7 can deliver the input information to the neural network more efficiently for simpler training. It also exposes more effective control features to the user, and allows the system to be used in an almost "modular" fashion.

In a preferred embodiment, two or more input networks 721, 721, . . . , 729 receive the different categories of input. One network 721 may receive an image of a garment 711, while another network 729 may receive an image of a shoe 719*a, b*. (The inventor has noted that "shoe" network performance can be improved by providing multiple images of the same shoe, e.g. images from the front and side.) Each input network may be a separate, multi-layer neural network with decreasing numbers of nodes at each level, which distills the information in its respective input(s) into a corresponding Z-vector 751, 752, . . . , 759 through the compression-like process described earlier.

From these Z-vectors, a plurality of output networks 731, 732, . . . , 739, operated independently according to the basic inventive principles, could be trained to generate synthetic images involving a model and their respective input(s). The "garment" network could produce an image of a model wearing the input garment, and the "shoe" network could produce an image of a model's leg (or a pair of legs) wearing the input shoe. But in this preferred embodiment, the separate Z vectors 751, 752, . . . , 759 are combined (e.g., concatenated) to form a combined Z-vector 760, which is delivered to a multi-element image synthesizer neural network 770. This output network creates an image of a model wearing the garment and the shoes (plus any other accessories whose images are provided to other input networks and concatenated into the composite Z vector 760, for example pants 712 whose image was provided through input neural network 722).

When the input networks are separated in this manner, they can be used separately and trained/re-trained independently. This arrangement also simplifies the identification of elements of the various Z vectors that affect aspects of the output image. These elements may be identified via Principal Component Analysis, PCA, as described above. Elements that control useful characteristics of the synthetic image may be described as "results-effective." For example, one Z vector element (or a set of covarying elements) may be effective to control model skin tone. Other results-effective variables may change the model's pose (e.g. turning left or right, or changing arm or leg position, etc.) Some results-effective variables may control characteristics of an item of apparel—for example, the softness or stiffness of the fabric drape, the length of a sleeve or hem, or the height of a shoe heel.

In this connection, it is appreciated that two especially useful results-effective variables control the body size or proportions of the (imaginary, synthesized) model, and the tightness of the clothes. These variables together allow the user to visualize the fit of different garment sizes.

Note that input "recognizer" network 729, which receives a plurality of images depicting different views of a shoe 719a and 719b and produces a Z vector 759, is suggested to be capable of synthesizing a picture of the shoe on a model's foot, 749. The foot is shown with three black dots for illustrative purposes. These dots would actually be recorded in the image as invisible metadata. They carry additional information about the pose of the synthesized model, so that (for example) the synthesis network could avoid producing composite images where the model's body parts are in an impossible configuration (e.g., left foot facing forward but right foot facing backward). In addition to "pose" information, other information to assist in recognizing or synthesizing images may also be provided to the neural network to improve its performance.

It is appreciated that adding new categories of inputs multiplies the complexity of the training problem and the number of training images necessary for the neural networks to be able to recognize and synthesize the desired images. For example, with one dress, one shoe and one handbag, it is preferable to present "model" images with the dress only (model barefoot and without the bag), model with shoes but no bag, model with bag but no shoes, and model with shoes and bag. If the system is to learn and synthesize multiple model poses, then even more model images may be required—the requirement for training images grows exponentially in the number of articles of apparel and model shapes, sizes and poses that the system is desired to handle.

Figure 8:
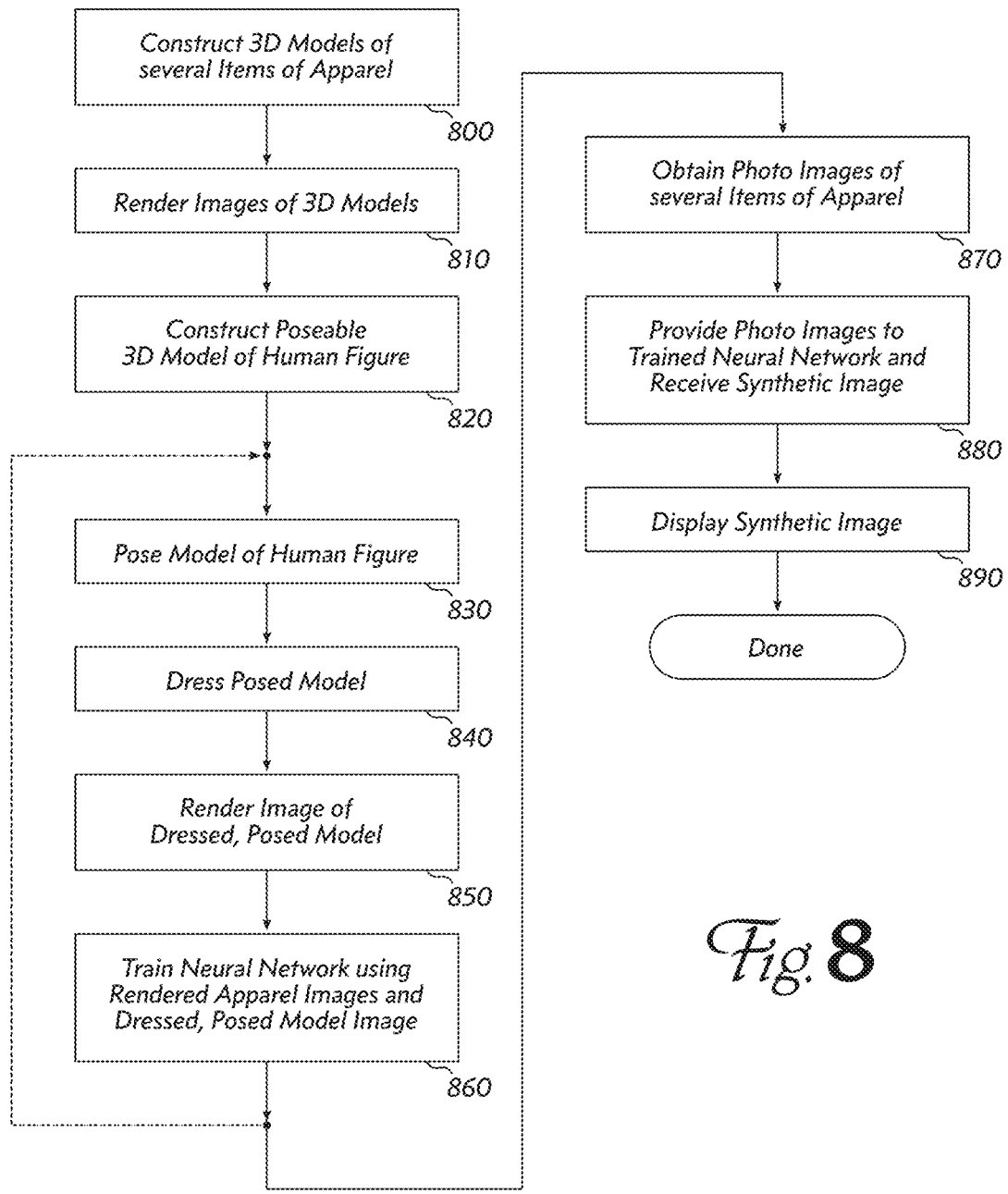
FIG. 8 is a flow chart outlining an effective method of training a neural network that implements an embodiment of the invention.

In a preferred training process outlined in FIG. 8, training images are synthesized from three-dimensional models of the various input-category items. These three-dimensional models are expensive and time-consuming to create, but they can be automatically combined in different groupings and photorealistic renderings can be automatically created with parametrically-generated model characteristics and poses. Thus, an arbitrarily-large number of training images can be created and presented to the neural networks. Furthermore, these training images can be created without lighting artifacts, minor pose variations and other defects that would be present in actual photos of a live model. With this fine-grained control over training images and the ability to automatically produce an arbitrary number of images, the neural networks can be trained efficiently, and with less risk of inadvertently training the network to recognize or respond to irrelevant information.

According to this process, the user constructs three-dimensional models of several items of apparel (800). These may be, for example, shirts, pants, jackets, dresses, scarves, hats or shoes. The models may include information to support rendering photo-realistic images, such as material characteristics, weaves, colors, patterns, and so on. The models can be automatically manipulated, for example, by simulating their physical characteristics and the effect of forces such as gravity and inertia on their materials. The size and dimensions of the models can also be automatically manipulated. For example, the hem length of a skirt, or the circumferential size of a sleeve can be increased or decreased.

Next, images of the models are rendered (810). These images are preferably in orientations and conditions that are inexpensive to emulate when producing photos of actual garments. For example, a photo of a dress laid flat against a backdrop is less expensive to produce than a photo of the same dress placed on a manikin. Thus, for the rendered image as well, it is preferable to show the dress against a flat surface. Information about the garment (material, color, etc.) can be used to render realistic folds and creases, even though the 3D model is placed against a flat surface (i.e., the rendering need not be perfectly flat, but rather should show what a real garment would look like if laid upon a flat surface, without being pressed or otherwise constrained).

Finally, in preparation for the generation of many training images, a 3D poseable model of a human figure is created (820). This figure may include information like height, weight, body-part lengths and girths, hair and skin color, and so on. (In fact, many different human-figure models may be created.) These models are also automatically manipulable, in that their parts may be positioned or posed in a way that is possible for a real person.

Next, for as many different training images as necessary, the human-figure model is posed (830) and dressed with some or all of the input items of apparel (840). "Dressing" refers to combining the human-figure model with the apparel models using an interference-aware software process that places the apparel at an appropriate distance from the surface of the figure model, and simulates effects such as gravity so that rendered images of the dressed model look realistic.

Now, a photo-realistic image of the posed and dressed model is created by rendering (850), and the input images from 810, and the posed and dressed "target" image from 850 are used to train the neural network (860). Additional training images can be made by re-posing the human-figure model, dressing it again, and rendering another target image. Beneficially, since the posing can be done automatically and parametrically by software, target images with little or no variance between intended poses can be produced. In other words, given two human-figure models of, say, different apparent weights or plumpness, both models can be posed in exactly the same positions, so that any differences between the rendered images can be learned by the neural network as related to model weight, rather than an artifact of inadvertent differences between the postures of two actual models attempting to assume the same position in a real photo shoot.

Once the neural network has been trained (which may require thousands or tens of thousands of automatically-produced training images), photographic images of several real items of apparel are obtained (870). As mentioned earlier, these images should be made in conditions similar to those in which the training apparel items were prepared at 810. These photographic images are provided to the trained neural network, which delivers a corresponding synthetic image that appears to show a model dressed in the apparel of the photographic images (880). In this synthetic photo, some or all of the apparel may be real (their images having been provided to the neural network), but the model is not real. The neural network, through its training, is able to properly layer clothing, for example by drawing a jacket over a shirt, or shoes over socks. Finally, the synthetic image may be displayed (890).

Note that training networks with photorealistic renderings of 3D models of garments, shoes, accessories and the like is quite time- and resource-intensive, but the resulting trained networks can produce the desired synthetic images from inputs that are significantly easier and less-expensive to obtain. Once trained, the network can operate on basic "flat" images of garments (i.e., an image of a garment laid flat against a planar background), front-and-side images of shoes, and one or a few images of each accessory type. The training process can include learning "no accessory," "no shoes" options, so that the synthesizer can generate those images, as well as images with any desired combination of shoes, bags, jewelry, and other features. Composite networks according to an embodiment of the invention may include input sub-networks to receive images and associated information including:

| | |
|---|---|
| Flat garment images | Necklace images |
| Mannikin garment images | Bracelet images |
| Shoe images (preferably two or three views) | Ring images |
| | Scarf images |
| Handbag images (preferably two or three views) | Necktie images |
| Hat images | |

In addition to training images, an embodiment of the invention can learn from text and other data sources. This may allow the synthesis or image-generator network to produce better results when comparable text and/or other data is available in a later operation. For example, textual "tags" associated with an image are sometimes available. In "garment" applications, tags may describe things such as the color, pattern, size, dimension, collar shape, fabric composition or characteristics, etc. These tags may help the recognizer decide whether an image plausibly depicts all of the input items. If a tag describes the garment color as "blue" or "patterned," then an output image showing a red or plain garment is less likely to be deemed plausible. Improved recognition/discrimination performance forces the generative portion of the network to produce better synthetic images to "fool" the recognizer. Since the desired output of the system is a synthetic image that "looks like" a real image, providing additional information (such as text tags) to the network lets the synthesizer produce better results.

It is appreciated that in a multi-input neural network like that described here, one of the inputs may be an image of a person (either naked or in a neutral body suit), standing in a neutral pose. If this image is provided to the input recognizer, and the network is trained to produce output images that match, then the overall system can synthesize images that appear to be a specific individual person wearing a selection of apparel. Thus, instead of just showing a generic model (having controllable height, weight, skin tone, pose, and other characteristics), the synthetic image could show a particular individual whose neutral-pose photo is provided, wearing the same apparel. In this embodiment, it would still be possible to adjust the pose of the (real) model or her apparent height or weight, using the same Z-vector controls that affect any other synthesized image produced by an embodiment. Thus, the output is not merely a morphing or interpolation of the garments so as to occlude the model image. Instead, all of the input images (including the image of the real person) are "compressed" down to Z vectors, and the generative network synthesizes a new image based on the (possibly modified) combined Z vector. A clear distinguishing characteristic of such a synthesized image is that the model is in a different pose than the input model image. For example, the input model image may be standing straight and facing forward, but the synthesized image may be turned left or right, or may have its arms or legs in different positions. However, the Z vector can also be adjusted to produce images showing what the person might look like if she gained or lost weight. This usage model may be of particular value.

The inventor has identified one additional input-data type that can be provided to the network during training to improve the quality of synthesized images. This is "pose" data. When a 3D model of a human figure is used, it is relatively common to specify its pose via reference points for skeletal joints. For example, the position of the head, shoulders, elbows, wrists, hips, knees and ankles can only vary over a limited range governed by the nature of the relevant joints. By specifying angles, orientations and joint-to-joint distances, the training figure pose can be defined efficiently. If this information is provided during training with the garments, tags and other information, then the neural network can learn to produce synthetic images that depict the imaginary model in a variety of poses. It is even possible to produce images of a sequence of successive poses, which may be displayed successively to produce an animation of the model showing off the garments and accessories as in a fashion show. Body-part girth data may be used like pose or joint-position data to help the neural network learn to depict models of different weights.

An embodiment of the invention may be a machine-readable medium, including without limitation a non-transient machine-readable medium, having stored thereon data and instructions to cause a programmable processor to perform operations as described above. In other embodiments, the operations might be performed by specific hardware components that contain hardwired logic. Those operations might alternatively be performed by any combination of programmed computer components and custom hardware components.

Instructions for a programmable processor may be stored in a form that is directly executable by the processor ("object" or "executable" form), or the instructions may be stored in a human-readable text form called "source code" that can be automatically processed by a development tool commonly known as a "compiler" to produce executable code. Instructions may also be specified as a difference or "delta" from a predetermined version of a basic source code. The delta (also called a "patch") can be used to prepare instructions to implement an embodiment of the invention, starting with a commonly-available source code package that does not contain an embodiment.

In some embodiments, the instructions for a programmable processor may be treated as data and used to modulate a carrier signal, which can subsequently be sent to a remote receiver, where the signal is demodulated to recover the instructions, and the instructions are executed to implement the methods of an embodiment at the remote receiver. In the vernacular, such modulation and transmission are known as "serving" the instructions, while receiving and demodulating are often called "downloading." In other words, one embodiment "serves" (i.e., encodes and sends) the instructions of an embodiment to a client, often over a distributed data network like the Internet. The instructions thus transmitted can be saved on a hard disk or other data storage device at the receiver to create another embodiment of the invention, meeting the description of a non-transient machine-readable medium storing data and instructions to perform some of the operations discussed above. Compiling (if necessary) and executing such an embodiment at the receiver may result in the receiver performing operations according to a third embodiment.

In the preceding description, numerous details were set forth. It will be apparent, however, to one skilled in the art, that the present invention may be practiced without some of these specific details. In some instances, well-known structures and devices are shown in block diagram form, rather than in detail, in order to avoid obscuring the present invention.

Some portions of the detailed descriptions may have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including without limitation any type of disk including floppy disks, optical disks, compact disc read-only memory ("CD-ROM"), and magnetic-optical disks, read-only memories (ROMs), random access memories (RAMs), erasable, programmable read-only memories ("EPROMs"), electrically-erasable read-only memories ("EEPROMs"), magnetic or optical cards, or any type of media suitable for storing computer instructions.

The algorithms and displays presented herein are not inherently related to any particular computer or other apparatus. Various general-purpose systems may be used with programs in accordance with the teachings herein, or it may prove convenient to construct more specialized apparatus to perform some method steps. The required structure for a variety of these systems will be recited in the claims below. In addition, the present invention is not described with reference to any particular programming language. It will be appreciated that a variety of programming languages may be used to implement the teachings of the invention as described herein.

The applications of the present invention have been described largely by reference to specific examples and in terms of particular allocations of functionality to certain hardware and/or software components. However, those of skill in the art will recognize that configurable, synthetic images of models wearing garments based on images of the garments alone can also be produced by software and hardware that distribute the functions of embodiments of this invention differently than herein described. Such variations and implementations are understood to be captured according to the following claims.

I claim:

1. A method comprising:
   initializing a multi-layer neural network having a reducing-topology input section to produce a Z vector, and an expanding-topology output section to generate a synthetic image based on the Z vector;
   training the multi-layer neural network with sets of training data, where each set of training data comprises:
   i) a first training image showing a first training item of apparel;
   ii) two (2) second training images showing two views of a second, different item of training apparel; and
   iii) a training target image showing a model dressed in the first training item of apparel and the second, different training item of apparel,
   said training to produce a trained image synthesis network;
   providing a set of instance data to the trained image synthesis network, said set of instance data comprising:
   I) a first instance image showing a first instance item of apparel;
   II) two (2) second instance images showing two views of a second, different instance item of apparel;
   obtaining an instance Z vector from the reducing-topology input section based on the set of instance data; and
   exporting a synthetic instance image from the expanding-topology output section based on the instance Z vector, wherein
   said synthetic instance image appears to show a model dressed in the first instance item of apparel and the second, different instance item of apparel.

2. The method of claim 1, further comprising:
   during training, obtaining a training Z vector produced by the reducing-topology input section in response to the first training image and the two second training images;
   identifying results-effective elements of the training Z vector; and
   adjusting a results-effective element of the instance Z vector to after a characteristic of the synthetic instance image.

3. The method of claim 1 wherein each set of training data further comprises;
   iv) a training model image showing a human figure in a training neutral pose; and
   wherein the training target image shows the human figure wearing the first training item of apparel and the second, different training item of apparel; and
   wherein the set of instance data further comprises:
   III) a model instance image showing a person in an instance neutral pose; and
   wherein the synthetic instance image appears to show the person wearing the first instance item of apparel and the second different instance item of apparel, a pose of the person in the synthetic instance image being different from the instance neutral pose of the model instance image.

4. The method of claim 1 wherein each set of training data further comprises:
   iv) at least one non-image datum relating to the first training image.

5. The method of claim 4 wherein the at least one non-image datum is selected from the group consisting of a text tag, a garment material, a garment size and a garment dimension.

6. The method of claim 1 wherein the first training item of apparel is selected from the group consisting of a shirt, a blouse, a dress, a skirt and a pant, and wherein
the first instance item of apparel is a same type of apparel as the first training item of apparel.

7. The method of claim 6 wherein the first training item of apparel and the first instance item of apparel are depicted flat but unconstrained against a planar surface.

8. The method of claim 1 wherein the second, different training item of apparel is selected from the group consisting of a shoe, a handbag, a hat, and a bracelet, and wherein
the second, different instance item of apparel is a same type of apparel as the second, different training item of apparel.

9. A method for training a neural network to synthesize images of a model wearing a plurality of items of apparel, comprising:
constructing an automatically-manipulable model of a first training item of apparel;
rendering an image of the first training item of apparel to produce a first training image;
constructing an automatically-manipulable model of a second, different training item of apparel;
rendering two images of the second, different training item of apparel to produce a second training image pair;
constructing an automatically-manipulable model of a human figure;
automatically manipulating the automatically-manipulable model of the human figure to produce a posed figure model;
automatically dressing the posed figure model with the automatically-manipulable model of the first training item of apparel and the automatically-manipulable model of the second, different training item of apparel to produce a dressed figure model;
rendering an image of the dressed figure model to produce a third training image; and
applying the first training image, the second training image pair and the third training image to the neural network to train the neural network to synthesize images similar to the third training image from instance images similar to the first training image and the second training image pair.

10. The training method of claim 9, wherein said applying produces a trained neural network, the method further comprising:
obtaining a first instance image of a first instance item of apparel by photographing the first instance item of apparel;
obtaining a second instance image pair of a second, different instance item of apparel by photographing the second, different instance item of apparel from two different viewpoints;
delivering the first instance image and the second instance image pair to the trained neural network; and
receiving a target image from the trained neural network, said target image resembling a non-existent human figure dressed in the first instance item of apparel and the second, different instance item of apparel.

11. The training method of claim 9, wherein said applying produces a trained neural network, the method further comprising:
rendering a neutral-pose image of the automatically-manipulable model of the human figure with the automatically-manipulable model of the human figure in a training neutral pose; and
applying the neutral-pose image, the first training image, the second training image pair and the third training image to the trained neural network.

12. The training method of claim 11, the method further comprising:
obtaining a first instance image of a first instance item of apparel by photographing the first instance item of apparel;
obtaining a second instance image pair of a second, different instance item of apparel by photographing the second, different instance item of apparel from two different viewpoints;
obtaining a third instance image of a person by photographing the person in an instance neutral pose;
delivering the first instance image and the second instance image pair and the third instance image to the trained neural network; and
receiving a target image from the trained neural network, said target image resembling the person dressed in the first instance item of apparel and the second, different instance item of apparel, wherein
a pose of the person in the target image is different from the instance neutral pose, or
an apparent weight of the person in the target image is different from an apparent weight of the person in the third instance image.

* * * * *